(12) United States Patent
Kaneko et al.

(10) Patent No.: US 8,316,254 B2
(45) Date of Patent: Nov. 20, 2012

(54) POWER-SAVING EFFECT APPARATUS AND METHOD BASED ON POWER-SAVING PARAMETERS AND POWER-SAVING AMOUNTS

(75) Inventors: Yoshihiro Kaneko, Fussa (JP); Hideaki Andou, Ome (JP); Yasuyuki Mizuura, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 137 days.

(21) Appl. No.: 12/757,810

(22) Filed: Apr. 9, 2010

(65) Prior Publication Data
US 2010/0275047 A1 Oct. 28, 2010

(30) Foreign Application Priority Data

Apr. 24, 2009 (JP) ................................. 2009-106674

(51) Int. Cl.
*G06F 1/32* (2006.01)
(52) U.S. Cl. ......................... 713/323; 713/321; 713/320
(58) Field of Classification Search ........... 713/300–340
See application file for complete search history.

(56) References Cited

U.S. PATENT DOCUMENTS

| | | | | |
|---|---|---|---|---|
| 7,111,179 B1 * | 9/2006 | Girson et al. | ................. | 713/300 |
| 7,366,921 B2 * | 4/2008 | Ranganathan | ................. | 713/300 |
| 7,464,278 B2 * | 12/2008 | Cohen et al. | ................. | 713/320 |
| 7,788,516 B2 * | 8/2010 | Conroy et al. | ................. | 713/340 |
| 7,895,459 B2 * | 2/2011 | Goodnow et al. | ............. | 713/340 |

FOREIGN PATENT DOCUMENTS

| | | |
|---|---|---|
| JP | H11-272369 A | 10/1999 |
| JP | 11-354253 | 12/1999 |
| JP | 2001-148751 A | 5/2001 |
| JP | 2007-048219 | 2/2007 |
| JP | 2007-065255 A | 3/2007 |
| JP | 2007-272268 A | 10/2007 |
| WO | WO 2005/002035 | 1/2005 |

OTHER PUBLICATIONS

Information Sheet.
Notice of Reasons for Rejection mailed by the Japanese Patent Office on Jun. 22, 2010, in corresponding Japanese Patent Application No. 2009-106674 in 6 pages.
Decision of Rejection mailed by the Japanese Patent Office on Oct. 26, 2010, in corresponding Japanse Patent Application No. 2009-106674 in 3 pages.
Office Action in Japanese Patent Application No. 2011-009905 mailed Jun. 5, 2012, in 5 pages.

* cited by examiner

*Primary Examiner* — Raymond Phan
(74) *Attorney, Agent, or Firm* — Knobbe, Martens, Olson & Bear, LLP

(57) ABSTRACT

According to one embodiment, an information processing apparatus having a power-saving function includes a power-saving control module, a power consumption measuring module, a log accumulation module, and a log display module. The power-saving control module sets each of predetermined components in the information processing apparatus in either a normal operation state or a power-saving state, based on power-saving parameters corresponding to the predetermined components. The power consumption measuring module measures a total power amount consumed by the apparatus in a predetermined time period. The power-saving effect calculation module calculates a power-saving effect value indicative of a power amount reduced in the predetermined time period by the setting of the power-saving parameters. The log storing module stores information indicative of the total power amount and the power-saving effect value. The log display module displays cumulative values which are periodically accumulated the total power amounts and the power-saving effect values.

12 Claims, 7 Drawing Sheets

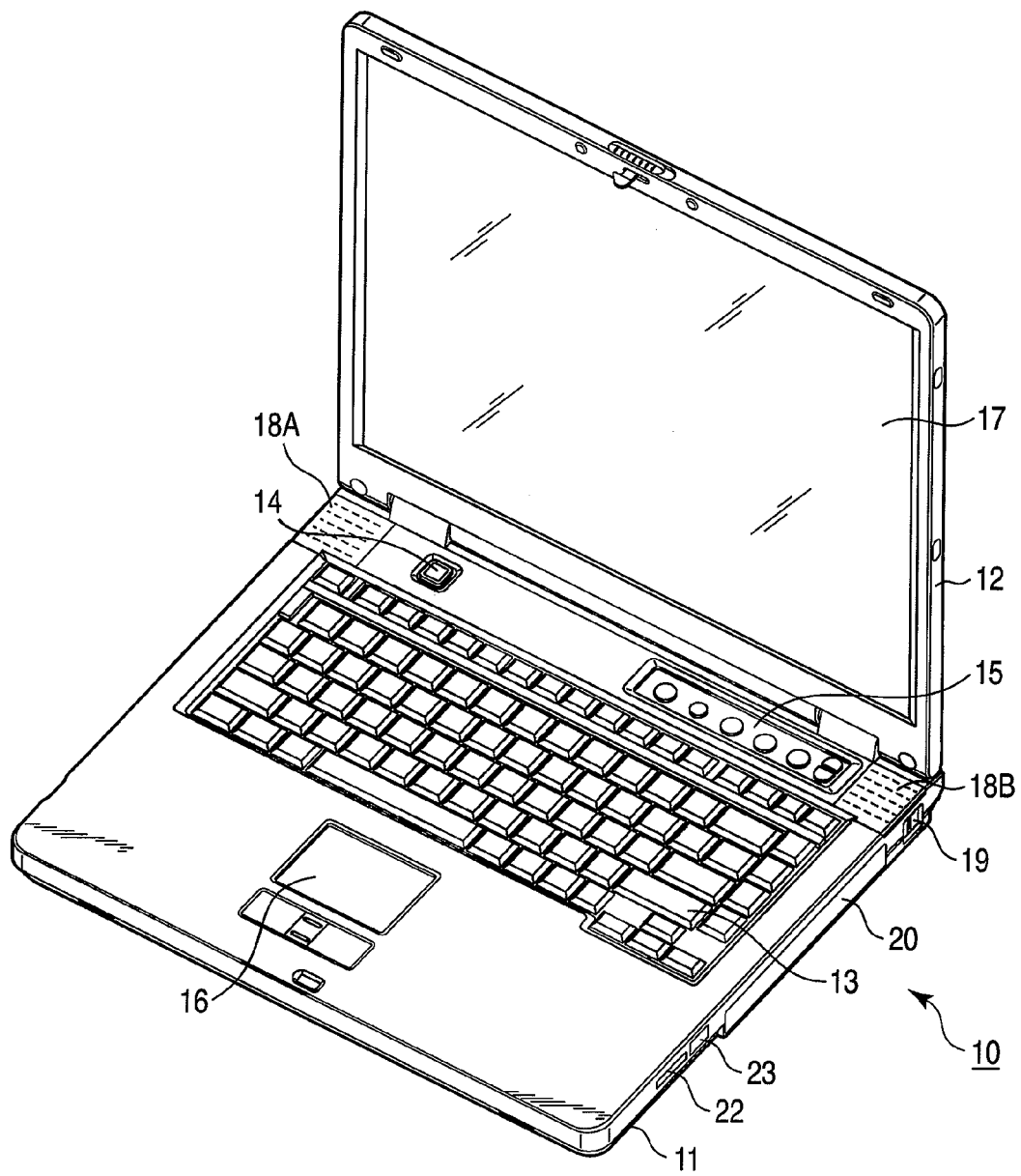
F I G. 1

| Examples of power-saving parameters with high power-saving effects |
|---|
| ODD power supply |
| USB port |
| Multimedia slot (card slot for SD card, etc.) |
| IEEE 1394 port |
| HDD rotation (platter rotation) |
| Wireless LAN/3G/Bluetooth (wireless communication device, etc.) |
| Wired LAN |
| Button LED |
| Keyboard LED |
| Brand logo LED |
| LCD luminance |
| LCD power supply |
| Sleep transition time |
| PCI Express power supply |
| CPU maximum clock number |

FIG. 4

| Date of measurement | Total power consumption amount | Power-saving effect value |
|---|---|---|
| 2009/4/13 | 120Wh | 20Wh |
| 2009/4/14 | 135Wh | 23Wh |
| 2009/4/15 | 90Wh | 12Wh |
| 2009/4/16 | 120Wh | 18Wh |
| 2009/4/17 | 155Wh | 26Wh |
| 2009/4/18 | 105Wh | 22Wh |
| ⋮ | ⋮ | ⋮ |

FIG. 5

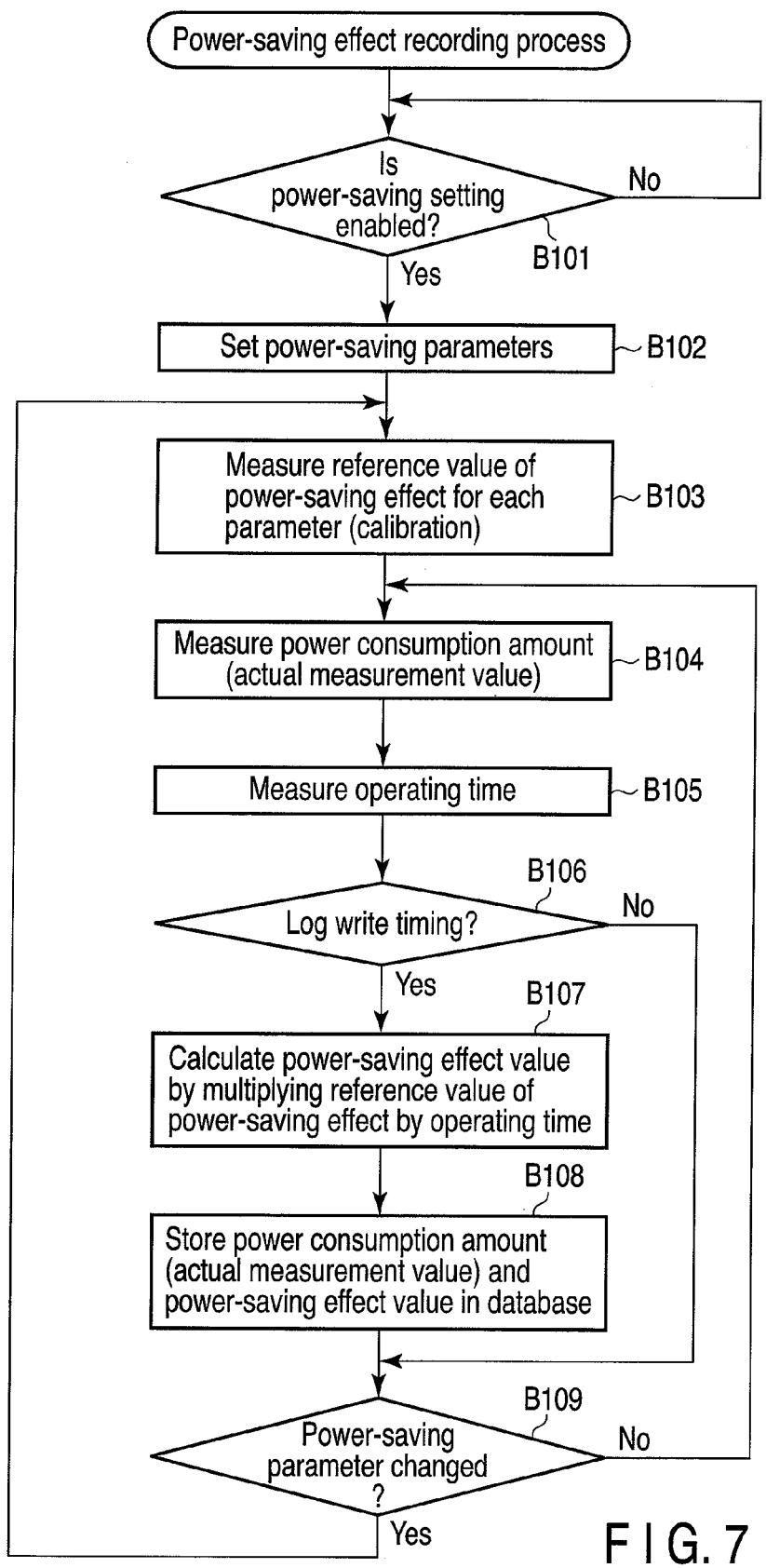
F I G. 7

POWER-SAVING EFFECT APPARATUS AND METHOD BASED ON POWER-SAVING PARAMETERS AND POWER-SAVING AMOUNTS

CROSS-REFERENCE TO RELATED APPLICATIONS

This application is based upon and claims the benefit of priority from Japanese Patent Application No. 2009-106674, filed Apr. 24, 2009, the entire contents of which are incorporated herein by reference.

BACKGROUND

1. Field

One embodiment of the invention relates to an information processing apparatus having a power-saving function, and to a power-saving effect display method applied to the information processing apparatus.

2. Description of the Related Art

In recent years, various types of personal computers having power-saving functions have been developed. This type of personal computer is provided with, for example, a utility program which enables a user to set parameters for power-saving. Using the utility program, the user can set, for example, a time until the personal computer is set in a hibernate state. If the set time has passed without an operation by the user, the personal computer is set in the hibernate state, and power consumption is reduced.

Jpn. Pat. Appln. KOKAI Publication No. H11-354253 discloses a saving display apparatus which enables selection between the operation of an electronic apparatus in a high power use mode with a high power consumption and the operation of the electronic apparatus in a low power use mode with a low power consumption. If the low power use mode is selected, a saving amount in the low power use mode, compared to the high power use mode, is displayed.

In this saving display apparatus, the high power use mode and low power use mode are switched, and the power amount reduced by the low power use mode is displayed. In this case, the difference between the power consumption in the high power use mode and the power consumption in the low power use mode can be used as the reduced power amount.

In the meantime, in an information processing apparatus such as a personal computer, whether or not to enable the power-saving function can be set with respect to each of components of the information processing apparatus. In addition, the power that can be reduced varies according to each of the components.

In the information processing apparatus, it is thus difficult to obtain the power-saving effect simply by applying the method of calculating a difference in power consumption between the two operation modes.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary perspective view showing an example of the external appearance of an information processing apparatus according to an embodiment of the present invention;

FIG. 4 shows examples of power-saving parameters with high power-saving effects, which are set by the power-saving effect display application shown in FIG. 3;

FIG. 5 shows an example of log information recorded by the power-saving effect display application shown in FIG. 3;

FIG. 7 is an exemplary flowchart showing an example of the procedure of a power-saving effect recording process executed by the information processing apparatus of the embodiment.

DETAILED DESCRIPTION

Figure 2:
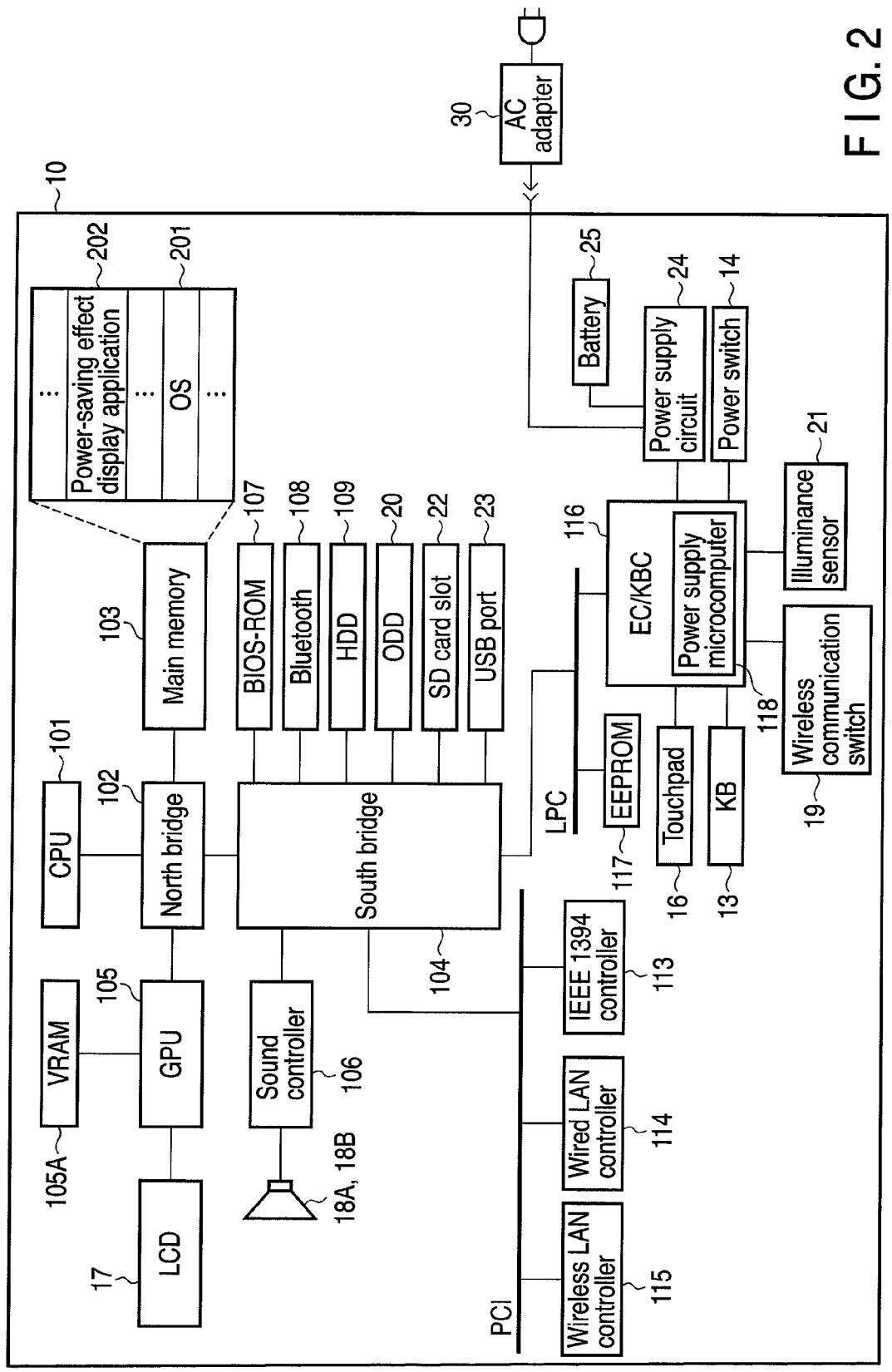
FIG. 2 is an exemplary block diagram showing the configuration of the information processing apparatus of the embodiment.

Various embodiments according to the invention will be described hereinafter with reference to the accompanying drawings. In general, according to one embodiment of the invention, there is provided information processing apparatus having a power-saving function comprising: a power-saving control module configured to set each of predetermined components in the information processing apparatus in either a normal operation state or a power-saving state, based on power-saving parameters corresponding to the predetermined components; a power consumption measuring module configured to measure a total power amount consumed by the information processing apparatus in a predetermined time period; a power-saving effect calculation module configured to calculate a power-saving effect value indicative of a power amount reduced in the predetermined time period by the setting of the power-saving parameters, based on the power-saving parameters, a power-saving amount per unit time of each of the components, and an operating time of the information processing apparatus in the predetermined time period; a log storing module configured to store information indicative of the total power amount and the power-saving effect value as log information in a storage device in every said predetermined time period; and a log display module configured to display cumulative total values which are periodically calculated by accumulating the total power amounts and the power-saving effect values respectively, based on the log information.

The structure of an information processing apparatus according to an embodiment of the present invention will now be described with reference to FIG. 1 and FIG. 2. The information processing apparatus of this embodiment is realized, for example, as a notebook-type portable personal computer 10.

FIG. 1 is a perspective view showing the personal computer 10 in the state in which a display unit thereof is opened. The personal computer 10 comprises a computer main body 11 and a display unit 12. A display device comprising a thin-film transistor liquid crystal display (TFT-LCD) 17 is built in the display unit 12.

The display unit 12 is attached to the computer main body 11 such that the display unit 12 is rotatable between an open position where the top surface of the computer main body 11 is exposed, and a closed position where the top surface of the computer main body 11 is covered. The computer main body 11 has a thin box-shaped housing. A keyboard 13, a power switch 14 for powering on/off the computer 10, an input operation panel 15, a touch pad 16, and speakers 18A and 18B are disposed on the top surface of the housing of the computer main body 11. A wireless communication switch 19, an optical disc drive (ODD) 20, an SD card slot 22 and a USB port 23 are provided, for example, on the right side surface of the computer main body 11. The input operation panel 15 is an input device for inputting an event corresponding to a button that is pressed. The input operation panel 15 includes a plurality of buttons for activating a plurality of functions.

Referring to FIG. 2, the system configuration of the computer 10 is described.

The computer 10, as shown in FIG. 2, comprises a CPU 101, a north bridge 102, a main memory 103, a south bridge 104, a graphics processing unit (GPU) 105, a video memory (VRAM) 105A, a sound controller 106, a BIOS-ROM 107, a Bluetooth™ module 108, a hard disk drive (HDD) 109, an ODD 20, an SD card slot 22, a USB port 23, an IEEE 1394 controller 113, a wired LAN controller 114, a wireless LAN controller 115, an embedded controller/keyboard controller IC (EC/KBC) 116, an EEPROM 117, a keyboard (KB) 13, a power switch 14, a touch pad 16, a wireless communication switch 19, an illuminance sensor 21, a power supply circuit 24, a battery 25, and an AC adapter 30.

The CPU 101 is a processor for controlling the operation of the computer 10. The CPU 101 executes an operating system (OS) 201 and various application programs, such as a power-saving effect display application program 202, which are loaded from the hard disk drive (HDD) 109 into the main memory 103. The power-saving effect display application program 202 is software for displaying the effect of the power-saving function of the computer 10. The power-saving effect display application program 202 executes a power-saving effect recording process for collecting log information that is indicative of a power consumption amount and a power-saving amount of the computer 10, and a power-saving effect display process for analyzing the log information and displaying the effect of the power-saving function. Besides, the CPU 101 executes a basic input/output system (BIOS) stored in the BIOS-ROM 107. The BIOS is a program for hardware control.

The north bridge 102 is a bridge device which connects a local bus of the CPU 101 and the south bridge 104. The north bridge 102 includes a memory controller which access-controls the main memory 103. The north bridge 102 also has a function of executing communication with the GPU 105 via, e.g. a PCI EXPRESS serial bus.

The GPU 105 is a display controller which controls the LCD 17 that is used as a display monitor of the computer 10. A video signal generated by the GPU 105, is sent to the LCD 17.

The south bridge 104 controls devices on an LPC (Low Pin Count) bus, and devices on a PCI (Peripheral Component Interconnect) bus. The south bridge 104 includes an IDE (Integrated Drive Electronics) controller for controlling the HDD 109 and ODD 20. The south bridge 104 also has a function of executing communication with the Bluetooth module 108 and sound controller 106. The sound controller 106 is a sound source device and outputs audio data, which is played back, to the speakers 18A and 18B. Furthermore, the south bridge 104 includes an SD card controller for controlling a card device (SD card) detachably loaded in the SD card slot 22, and a USB controller which controls a USB device detachably connected to the USB port 23.

The IEEE 1394 controller 113, wired LAN controller 114 and wireless LAN controller 115 are connected to the PCI bus.

The IEEE 1394 controller 113 executes communication with an external device via an IEEE 1394 serial bus. The wired LAN controller 114 is a communication device which executes communication of, e.g. the IEEE 802.3 standard. The wireless LAN controller 115 is a wireless communication device which executes communication of, e.g. the IEEE 802.11 standard.

The embedded controller/keyboard controller IC (EC/KBC) 116 is a one-chip microcomputer in which an embedded controller for power management and a keyboard controller for controlling the keyboard (KB) 13 and touch pad 16 are integrated.

The embedded controller/keyboard controller IC (EC/KBC) 116 has a function of cooperating with the power supply circuit 24, thereby powering on/off the computer 10 in accordance with the user's operation of the power switch 14. The power supply circuit 24 uses power supplied from the outside via the AC adapter 30 or power supplied from the battery 25, and supplies power to the respective components of the computer 10. In other words, the computer 10 is driven by power supplied from an external power supply such as an AC commercial power supply, or by power supplied from the battery 25. The AC adapter 30 may be provided within the computer 10. In addition, the power supply circuit 24 has a function of determining whether power is supplied from the external power supply to the computer 10 via the AC adapter 30. If power is supplied from the external power supply to the computer 10, the power supply circuit 24 supplies power to the respective components of the computer 10 by using the power supplied from the external power supply. On the other hand, if no power is supplied from the external power supply to the computer 10, the power supply circuit 24 supplies power to the respective components of the computer 10 by using the power supplied from the battery 25. Besides, the power supply circuit 24 has a function of charging the battery 25 by using power from the external power supply.

The embedded controller/keyboard controller IC (EC/KBC) 116 includes a power supply microcomputer 118. The power supply microcomputer 118 is a microcomputer for measuring power (power supply current [A] and power supply voltage [V]) which is output from the power supply circuit 24. The power supply microcomputer 118 can individually measure the power supply current and power supply voltage for driving the computer 10, and the power supply current and power supply voltage for charging the battery 25. The power-saving effect display application 202 executed on the computer 10 can refer to the power supply current and power supply voltage, which have been measured by the power supply microcomputer 118, via the BIOS, and can calculate the power (instantaneous value) [W] supplied to drive the computer 10. Accordingly, the power-saving effect display application 202 can also calculate the power consumption amount [Wh] by accumulating the calculated power [W] at regular intervals.

The embedded controller/keyboard controller IC (EC/KBC) 116 has a function of turning on/off the Bluetooth module 108 and wireless LAN controller 115, in accordance with the operation of the wireless communication switch 19. If the wireless communication switch 19 is set in an OFF position, both the Bluetooth module 108 and wireless LAN controller 115 are set in an OFF state (power-off state).

Besides, the embedded controller/keyboard controller IC (EC/KBC) 116 has a function of controlling the illuminance sensor 21. The illuminance sensor 21 is a sensor which measures the illuminance of the environment in which the computer 10 is used.

Figure 3:
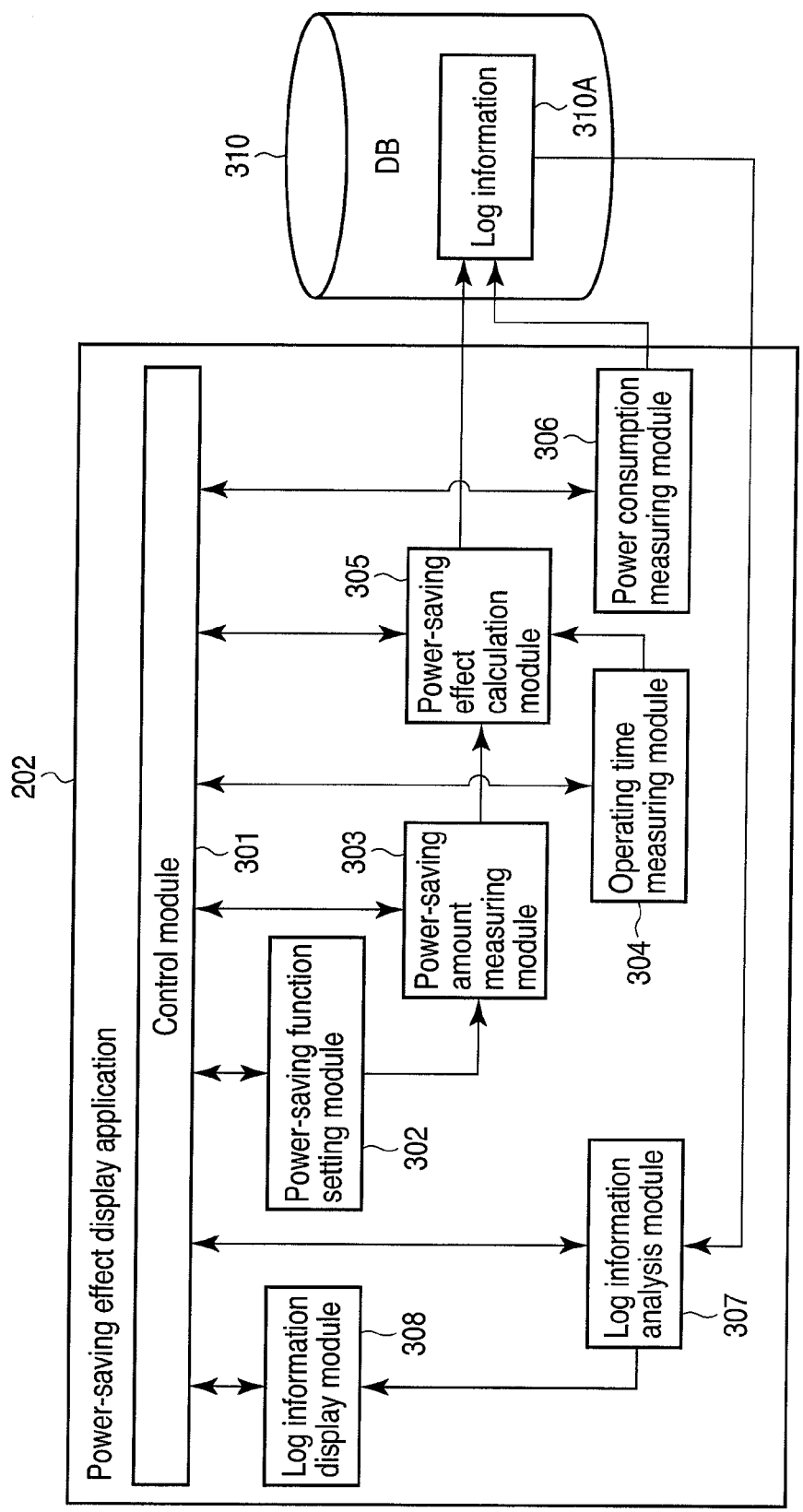
FIG. 3 is an exemplary block diagram showing the functional configuration of a power-saving effect display application used in the information processing apparatus of the embodiment.

FIG. 3 is a block diagram showing the functional configuration of the power-saving effect display application 202.

The power-saving effect display application 202 includes a control module 301, a power-saving function setting module 302, a power-saving amount measuring module 303, an operating time measuring module 304, a power-saving effect calculation module 305, a power consumption measuring module 306, a log information analysis module 307, and a log information display module 308. The power-saving effect display application 202 executes a process of reading/writing data from/in a database 310. The database 310 is a storage device, such as the HDD 109, which stores log information 310A.

The control module 301 controls the operations of the respective components of the power-saving effect display application 202.

The power-saving function setting module 302 sets power-saving parameters, which are set for the respective components in the computer 10. The power-saving parameters are parameters applied to some predetermined components in the computer 10. The components in the computer 10 refer to the respective components which have been described with reference of FIG. 2. In short, the power-saving parameter is indicative of the content of the power-saving function applied to each component. The power-saving parameter designates either a normal operation state in which each component is operated by normal power consumption, or a power-saving state in which each component is operated by lower power consumption than the normal power consumption. Based on the setting of the power-saving parameter corresponding to each component, the power-saving function setting module 302 can set each component in either the normal operation state or the power-saving state. Besides, the power-saving parameter, which designates the power-saving state, designates one of operation levels with different power consumptions.

Thus, the power-saving parameters include, for instance, the power consumption of each component in the computer 10; the condition of heat control of each component in the computer 10; the processing speed of the CPU 101; the amount of use of the main memory 103, the luminance of the LCD 17; the lighting time of the backlight; the time until power-off of the LCD 17; the time until power-off of the HDD 109; the time until power-off of the ODD 20; the time until setting the system in a sleep mode; and the time until setting the computer 10 in a hibernate state. The power-saving parameters further comprise parameters which designate power-on/off of predetermined I/O devices in the computer 10, such as the sound controller 106, speakers 18A and 18B, ODD 20, Bluetooth module 108, wired LAN controller 114, wireless LAN controller 115, an SD card controller for controlling communication with an SD card inserted in the SD card slot 22, and a USB controller for controlling communication with a device connected to the USB port 23.

The respective components in the computer 10 are controlled in accordance with the power-saving parameters set by the power-saving function setting module 302. For example, in the case where the time until power-off of the LCD 17, which is a power-saving parameter, is set at 10 minutes, the LCD 17 is powered off if the display state on the LCD 17 remains for 10 minutes without an operation by the user. In addition, for example, in the case where the power-saving parameter, which is indicative of power-on/off of the ODD 20, is set at "OFF", the ODD 20 is powered off.

In the case of powering off the I/O device in the computer 10, such as the ODD 20, the power to the I/O device may be completely shut off, or, while the power supply to a bus connection part of the I/O device is being maintained, the power supply to the other parts of the I/O device may be shut off. The connection between the I/O device and the bus can be maintained by keeping power supply to the bus connection part of the I/O device, and the power supplied to the I/O device can be reduced by shutting off power supply to the other parts of the I/O device.

In addition to the control to power on/off the I/O device in the computer 10, control is executed to power on/off removable devices (external devices) such as an IEEE 1394 device connected to the IEEE 1394 controller 113 and a USB device connected to the USB port 23. That is, control is also executed to supply power to the removable devices. In the case where the power-saving parameter indicative of power-on/off of a removable device is set at "OFF", the power supply to the removable device is shut off. Thereby, the power supplied to the removable device can be reduced.

In the case of powering on/off the I/O device or removable device, the control to power on/off the device may be directly executed, as described above, or a control signal for powering on/off the device may be sent to the BIOS. In the latter case, the BIOS, which has received the control signal, controls the power supplied to the device, via the EC/KBC 116 or power supply circuit 24. For example, in the case where the power-saving parameter indicative of power-on/off of ODD 20 is set at "OFF", a control request for powering off the ODD 20 is sent to the BIOS from the power-saving effect display application program 202. The BIOS sends a control command for shutting off the power supply to the ODD 20 to the EC/KBC 116. In accordance with the control command sent from the BIOS, the EC/KBC 116 cooperates with the power supply circuit 24 and shuts off the power supply to the ODD 20.

The power-saving function setting module 302 sets the values designated by the user, as the power-saving parameters. In the meantime, the power-saving function setting module 302 may set recommendable values with high power-saving effects which correspond to the usage pattern of the computer 10 by the user, as the power-saving parameters. For example, the power-saving function setting module 302 changes the luminance level of the LCD 17, which is chosen from 8 levels with different power consumptions, from a luminance level 8 at the time of shipment to a luminance level 4 which is a recommendable level.

The power-saving function setting module 302 notifies the power-saving amount measuring module 303 of the set power-saving parameters.

The power-saving amount measuring module 303 measures the power amount (power-saving amount) [W], which is reduced per unit time by the setting in the power-saving state, with respect to each of the components. The power amount reduced in the power-saving state, differs from component to component in the computer 10. Thus, in order to find the power amount reduced in the computer 10 as a whole, it is necessary to measure the power-saving amount of each of the components in the computer 10. Accordingly, based on the power-saving parameters corresponding to the respective components in the computer 10, the power-saving amount measuring module 303 calculates a difference between the power consumption in the normal operation state of the components and the power consumption in the power-saving state designated by the power-saving parameter, as a power-saving amount.

For example, the power-saving amount measuring module 303 finds the power-saving amount in the following manner.

To start with, the power-saving amount measuring module 303 sets all the components in the computer 10 in the normal operation state, and measures the power consumption by the computer 10. The power-saving amount measuring module 303 calculates the power consumption by the computer 10, by using the current value and the voltage value for use in driving the computer 10, which are measured by the power supply microcomputer 118, as described above.

Subsequently, the power-saving amount measuring module 303 selects, from among a predetermined number of components in the computer 10, those components for which the power-saving state has been designated by the power-saving parameters. The power-saving amount measuring module 303 sets one of the selected components in the power-saving state, and measures the power consumption of the power used by the computer 10. The power-saving amount measuring module 303 calculates the difference between the power consumption measured by setting all the components in the computer 10 in the normal operation mode, and the power consumption measured by setting one component in the power-saving state, as the power-saving amount of the component set in the power-saving state.

In addition, the power-saving amount measuring module 303 sets another of the selected components in the power-saving state, and measures the power consumption used by the computer 10. Specifically, two components of the selected components are set in the power-saving state, and the power consumption used by the computer 10 is measured. The power-saving amount measuring module 303 calculates, as the power-saving amount of the another component that is newly set in the power-saving state, the difference between the power consumption measured by setting one of the components in the computer 10 in the power-saving state, and the power consumption measured by setting two components in the power-saving state.

By the same method, the power-saving amount measuring module 303 finds the power-saving amounts with respect to all components included in the selected components. The method of measuring the power-saving amount of each component is not limited to the above-described method of finding the difference from the power consumption of the entire computer 10. Any other methods are usable, including a method of measuring the power-saving amount by comparing the current value and voltage value used in the normal operation state of each component and the current value and voltage value used in the power-saving state of each component. The power-saving amount measuring module 303 may measure the power-saving amount of each component, which corresponds to any power-saving setting pattern which is usable in the computer 10, or may measure the power-saving amount (the power-saving amount of each component that is currently set in the power-saving state) of each component corresponding to the current power-saving setting.

The power-saving amount measuring module 303 outputs to the power-saving effect calculation module 305 the calculated power-saving amount of each component that is set in the power-saving state.

In the meantime, the power-saving amount measuring module 303 measures the power-saving amount of each component, for example, in response to the boot of the computer 10, to the execution of the power-saving effect display application program 202, or to the setting/change of the power-saving parameter. The power-saving parameters may be changed when necessary, for example, by the setting/change by the user. Thus, the power-saving amount measuring module 303 dynamically detects the power-saving amount corresponding to the setting/change of the power-saving parameter by the user, and measures the power-saving amount corresponding to the set value of the power-saving parameter.

The operating time measuring module 304 measures the time of use of the computer 10, that is, the operating time of the computer, within a predetermined time period. Thus, the operating time measuring module 304 measures, for example, how many hours in a day the computer 10 is used. In the case where the computer 10 is used from 9:00 to 17:00, the operating time measuring module 304 determines that the use time is eight hours, by measuring the operating time of the computer 10.

If the value of the power-saving parameter is changed within a predetermined time period, the operating time before the change and the operating time after the change may be separately measured. Specifically, if a first power-saving parameter setting is changed to a second power-saving parameter setting within a predetermined time period, the operating time measuring module 304 measures the operating time of the computer 10 with the first power-saving parameter setting and the operating time of the computer 10 with the second power-saving parameter setting. For example, if the computer 10 is used from 9:00 to 12:00 with the first power-saving parameter setting, and then the computer 10 is used from 13:00 to 17:00 with the second power-saving parameter setting, the operating time measuring module 304 measures the operating time of the computer 10 and determines that the operating time of the computer 10 with the first power-saving parameter setting is three hours, and that the operating time of the computer 10 with the second power-saving parameter setting is four hours.

The operating time measuring module 304 outputs the measured operating time to the power-saving effect calculation module 305.

The power-saving effect calculation module 305 calculates a power-saving effect value based on the power-saving amount of each component output from the power-saving amount measuring module 303, and the operating time of the computer 10 within the predetermined time period output from the operating time measuring module 304. The power-saving effect value is a value indicative of the power amount reduced in the computer 10 within the predetermined time period.

Specifically, to begin with, the power-saving effect calculation module 305 multiplies the power-saving amount of each of components in the power-saving state, by the operating time of the computer 10 within the predetermined time period, thereby calculating the power-saving effect value of each component. In short, the power-saving effect value of each component is calculated by the following equation:

$$\text{power-saving effect value of each component [Wh]} = \text{power-saving amount of each component [W]} \times \text{operating time [h]}$$

Subsequently, the power-saving effect calculation module 305 accumulates the power-saving effect values of all the components in the power-saving state, and calculates the cumulative total value as the power-saving effect value of the computer 10 within the predetermined time period. The power-saving effect calculation module 305 records the calculated power-saving effect value of the computer 10 within the predetermined time period as the log information 310A in the database 310.

The power consumption measuring module 306 measures the total power amount consumed by the computer 10. As has been described above, the power consumption [W] of the computer 10 is calculated by using the current value and voltage value measured by the power supply microcomputer 118. The power consumption measuring module 306 calculates the power consumption at regular intervals (e.g. in every second). The power consumption measuring module 306 calculates the power consumption amount (total power amount) [Wh] during a predetermined time period (e.g. one day) based on the power consumption calculated at regular intervals during the predetermined time period.

Specifically, the power consumption measuring module 306 refers, at regular intervals, to the current value and the voltage value which are currently used by the computer 10 and are measured by the power supply microcomputer 118, for example, via the BIOS. The power consumption measuring module 306 calculates the power consumption by multiplying the current value and the voltage value. The power consumption measuring module 306 calculates the total power amount in a predetermined time period by accumulating the calculated power consumption during the predetermined time period. Accordingly, for example, if the computer 10 is operated for eight hours with the power consumption of 1 W, the power consumption measuring module 306 calculates the total power amount consumed by the computer 10, to be 8 Wh.

The power consumption measuring module 306 records the calculated total power amount as the log information 310A in the database 310.

The log information analysis module 307 reads the log information 310A from the database 310 and analyzes the read log information 310A.

Specifically, to start with, the log information analysis module 307 extracts the data to which dates within a predetermined time period (e.g. one year) are added, from the log information 310A of the database 310. Each of the extracted data items includes information indicative of the power consumption and power-saving effect value within one day specified by the associated date.

Subsequently, the log information analysis module 307 calculates the power consumption amount and power-saving effect value within each predetermined time period (e.g. one year, one month, or one week) by accumulating the extracted power consumption amounts and power-saving effect values which are on a daily basis. In short, the log information analysis module 307 calculates values respectively accumulated the extracted daily-basis power consumption amounts and power-saving effect values for each predetermined time period. Accordingly, for example, the log information analysis module 307 reads the data for one year from January to December from the database 310, and calculates the monthly power consumption amounts and power-saving effect values from January to December.

The log information analysis module 307 outputs the calculated power consumption amount and power-saving effect value for each predetermined time period and the calculated power consumption amount and power-saving effect value for each day to the log information display module 308 together with date information.

The log information display module 308 generates a power-saving effect display screen 40 based on the power consumption amount and power-saving effect value of the computer 10 for each predetermined time period and the power consumption amount and power-saving effect value of the computer 10 for each day, which are input from the log information analysis module 307. The log information display module 308 then displays the generated power-saving effect display screen 40 on the LCD 17, for instance. An example of the power-saving effect display screen 40 will be described later with reference to FIG. 6. As in this example, the log information display module 308 displays the power consumption amounts and power-saving effect values in the form of a graph. Based on the displayed information indicative of the power consumption amounts and power-saving effect values of the computer 10, the user can understand the power-saving effect according to the power-saving setting and the time-series variation of the power-saving effect.

The power-saving effect display application 202 is realizable as a resident program which starts in response to the start of the OS 201 and terminates in response to the end of the OS 201. The power-saving effect display application 202 monitors the power consumption amount and power-saving amount of the computer 10 by the user during the period in which the OS 201 is running (i.e. the period in which the computer 10 is powered on). The power-saving effect display application 20 then records the power consumption amount and power-saving amount in the database 310 as the log information 310A. In addition, in response to, e.g. a request by the user, the power-saving effect display application 202 displays the power-saving effect display screen 40 on the LCD 17.

Besides, in the power-saving effect display application 202, only the power-saving function setting module 302, power-saving amount measuring module 303, operating time measuring module 304, power-saving effect calculation module 305, and power consumption measuring module 306, which function to calculate the power consumption amount and power-saving effect value of the computer 10, may be configured as a resident program. On the other hand, the log information analysis module 307 and log information display module 308, which relate to the display of the power-saving effect, may be configured as a program which is executed in every predetermined time period or executed only at the request by the user.

FIG. 4 shows power-saving parameters with high power-saving effects, the power-saving parameters being set by the power-saving effect display application 202.

The settings of the power-saving parameters with high power-saving effects are, for example, power-off of the ODD 20; turn-off of the USB port 23 (USB controller); turn-off of the multimedia slot such as the SD card slot 22 (SD card controller); turn-off of the IEEE 1394 port (IEEE 1394 controller 113); turn-off of the rotation of the spindle motor of the HDD 109 (stop of platter rotation); turn-off of the wireless communication device such as the wireless LAN 115, 3G, or Bluetooth module 108; turn-off of the wired LAN 114; turn-off of the button LED such as the power switch 14; turn-off of the LED of the keyboard 13; turn-off of the LED of a brand logo, etc.; lowering of the luminance of the LCD 17; turn-off of the power to the LCD; shortening of the sleep transition time of the computer 10; power-off of the PCI Express; and lowering of the maximum clock number of the CPU 101. As has been described above, by setting, as each power-saving parameter, the value which sets the associated component in the power-saving state, the power used by the component can be suppressed, and a high power-saving effect value can be obtained.

Next, referring to FIG. 5, a description is given of an example of data recorded as log information 310A of the database 310 by the power-saving effect display application program 202.

The log information 310A is composed of data of, for instance, a date of measurement, a total power consumption amount and a power-saving effect value.

The date of measurement is indicative of the date when the total power consumption amount and power-saving effect value are measured (calculated). Thus, for example, a date, such as "2009/4/13", is recorded.

The total power consumption amount is indicative of a power amount [Wh] used by the computer 10 within one day specified by the date of measurement. Thus, for example, a power amount, "120 Wh", used by the computer 10 on the date of measurement, "2009/4/13", is recorded.

The power-saving effect value is indicative of a reduced power consumption amount [Wh] of the computer 10, which is reduced by the power-saving function of the power-saving effect display application 202 within one day specified by the date of measurement. Thus, for example, a power amount, "20 Wh", reduced by the power-saving function of the power-saving effect display application 202 on the date of measurement, "2009/4/13", is recorded.

The log information analysis module 307 and log information display module 308 generate the power-saving effect display screen 40 by using the log information 310A recorded in this manner.

Figure 6:
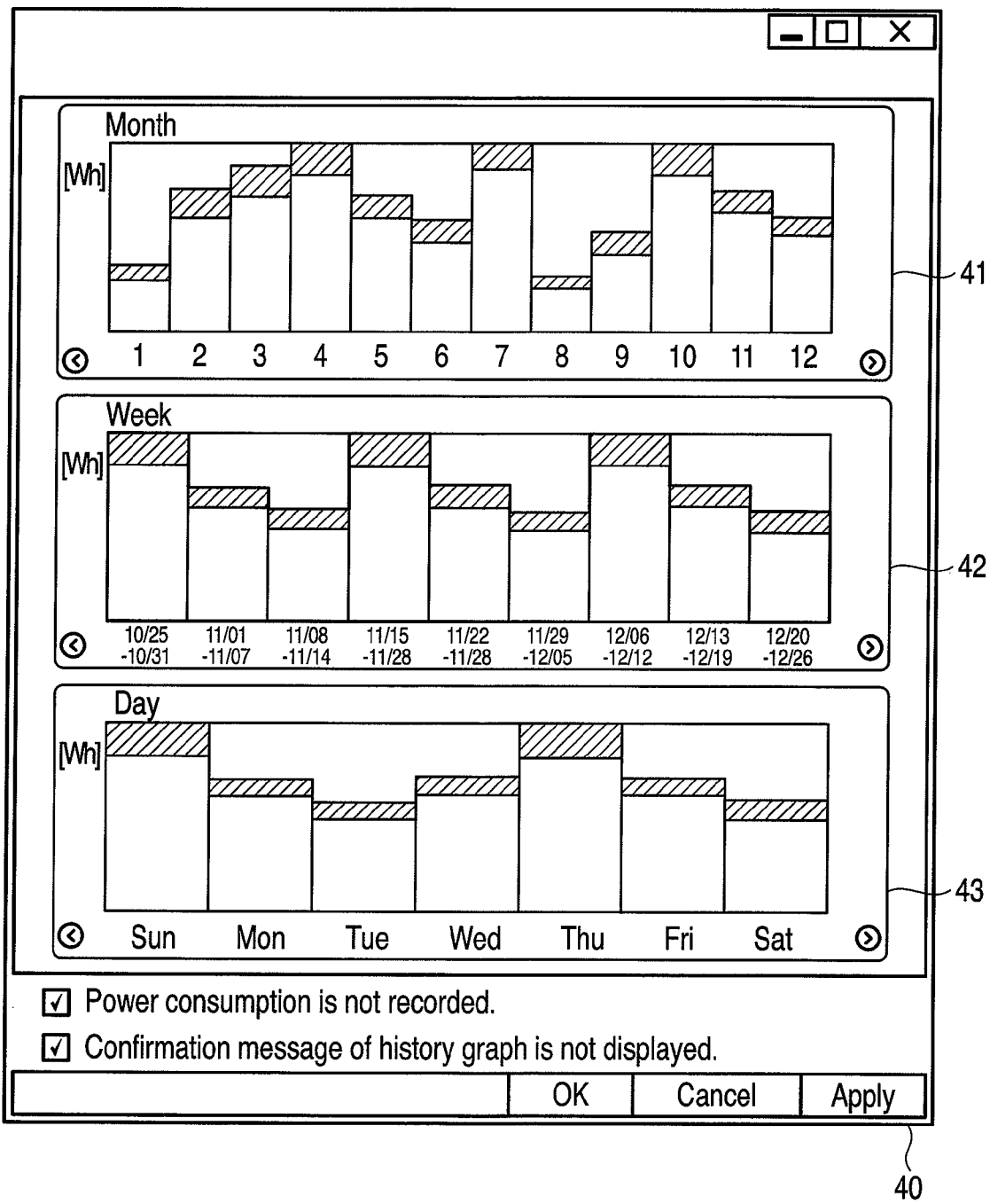
FIG. 6 shows an example of a power-saving effect display screen displayed by the power-saving effect display application shown in FIG. 3.

FIG. 6 shows an example of the power-saving effect display screen 40 displayed by the power-saving effect display application 202.

The power-saving effect display screen 40 displays the power consumption amounts and power-saving effect values for predetermined time periods in the form of graphs. FIG. 6 shows, in the order from the upper part of the power-saving effect display screen 40, a histogram 41 showing the power consumption amount and power-saving effect value on a monthly basis, a histogram 42 showing the power consumption amount and power-saving effect value on a weekly basis, and a histogram 43 showing the power consumption amount and power-saving effect value on a daily basis.

Each histogram is a stacked bar chart in which a histogram indicative of a power-saving effect value is stacked on a histogram indicative of a power consumption amount (total power consumption amount). Accordingly, the power consumption amount and power-saving effect value of each month (or each week or each day) can be read from each histogram. In addition, since the power consumption amount and power-saving effect value of each month (or each week or each day) are displayed over a predetermined time period (e.g. one year), the variation of the power consumption amount and power-saving effect value over the predetermined time period can be understood. The value indicated by the entirety of each stacked histogram (the sum of the power consumption amount and power-saving effect value) represents the power amount that is consumed if the computer 10 is operated in the normal operation state, that is, the power amount that is consumed if the computer 10 is operated without using the power-saving function.

The graph displayed on the power-saving effect display screen 40 is generated, for example, by using the power consumption amount and power-saving effect value measured in a most recent predetermined period. In FIG. 6, for example, the histogram 41 on a monthly basis is generated by using the power consumption amounts and power-saving effect values measured in the most recent year. The histogram 42 on a weekly basis is generated by using the power consumption amounts and power-saving effect values measured in the most recent 9 weeks. The histogram 43 on a daily basis is generated by using the power consumption amounts and power-saving effect values measured in the most recent 7 days.

FIG. 7 is the flowchart showing an example of the procedure of the power-saving effect recording process executed by the computer 10.

To start with, the power-saving effect display application 202 determines whether the power-saving function of the computer 10 is enabled or not (block B101). The power-saving function of the computer 10 is enabled or disabled, for example, by the user.

If the power-saving function of the computer 10 is enabled (YES in block B101), the power-saving effect display application 202 sets values for predetermined power-saving parameters (block B102). Each power-saving parameter is, as described above, a parameter which designates power-on or power-off of one of components in the computer 10, or designates one of operation levels with different power consumptions. Specifically, the power-saving effect display application 202 sets each component of the computer 10 in either the normal operation state in which power is turned on, or the power-saving state in which power is turned off or a low power consumption operation level is selected, in accordance with the designated value of the power-saving parameter.

Subsequently, the power-saving effect display application 202 measures a power-saving amount which is a reference value of the power-saving effect for each component ("calibration") (block B103). The power-saving amount of each component is a power amount reduced per unit time by the setting of the component in the power-saving state. Accordingly, the power-saving effect display application 202 measures the power-saving amount reduced per unit time by the setting of the component in the power-saving state, with respect to each of the components.

The power-saving effect display application 202 measures the power consumption amount used by the computer 10 within a predetermined time period (block B104). Specifically, the power-saving effect display application 202 refers to the current value and the voltage value, which are currently used by the computer 10 and are measured by the power supply microcomputer 118, via the BIOS. Using the current value and the voltage value, the power-saving effect display application 202 calculates the power consumption amount which is currently consumed by the computer 10. The power-saving effect display application 202 calculates the value by adding the calculated power consumption amount to the already-consumed power consumption amount by the computer 10 within a predetermined time period, as a power consumption amount in the predetermined time period (e.g. one day).

For example, if the power consumption (i.e. the power consumption amount per second) that is currently used by the computer 10 is calculated in every second, the power-saving effect display application 202 calculates the value accumulated the calculated power consumptions on a second-by-second basis for a predetermined time period (e.g. one day), as the power consumption amount in the predetermined time period (one day).

In addition, for example, if the power consumption (i.e. the power consumption per second) that is currently used by the computer 10 is calculated in every two seconds, the power-saving effect display application 202 converts the power consumption calculated in every two seconds to the power consumption consumed within two seconds, and calculates the value accumulated the converted power consumption amount within two seconds for a predetermined time period (e.g. one day), as the power consumption amount in the predetermined time period (one day).

The power-saving effect display application 202 measures the operating time indicative of the time for which the computer 10 is used within the predetermined time period (block B105). If the computer 10 is used with the same setting of the power-saving parameter at the time when the operating time was measured previously, the power-saving effect display application 202 updates the value set as the operating time to a value to which an elapsed time from the previous measurement is added. If the computer 10 is used with a setting of the power-saving parameter, which is different from the setting at the time when the operating time was measured previously, the power-saving effect display application 202 sets the elapsed time from the beginning of use with the current power-saving parameter, as a value of operating time.

Thereafter, the power-saving effect display application 202 determines whether there has come a timing of recording the power consumption amount and power-saving effect value in the database 310 (block B106). The power-saving effect display application 202 stores the power consumption amounts and power-saving effect values, together with information of, e.g. dates, in the database 310 as the log information 310A at every predetermined timing (e.g. in every day).

If there has come the timing of recording the power consumption amount and power-saving effect value in the database 310 (YES in block B106), the power-saving effect display application 202 calculates the power-saving effect value obtained by multiplying the sum of the power-saving amounts (reference values of power-saving effects), which correspond to the components set in the power-saving state, by the operating time measured in block B105 (block B107). Then, the power-saving effect display application 202 stores the power consumption amount measured in block B104, and the power-saving effect value calculated in block B107, in the database 310 as the log information 310A (block B108).

After the process of block B108 is completed, or if there has not yet come the timing of recording the power consumption amount and power-saving effect value in the database 310 (NO in block B106), the power-saving effect display application 202 determines whether the power-saving parameter has been changed (block B109).

If the power-saving parameter has been changed (YES in block B109), the power-saving effect display application 202 executes the process beginning from block B103. Specifically, the power-saving effect display application 202 measures the power-saving amount with respect to the component in the computer 10, which has newly been set in the power-saving state, and calculates the power consumption amount and the power-saving effect value.

On the other hand, if the power-saving parameter has not been changed (NO in block B109), the power-saving effect display application 202 executes the process beginning from block B104.

By the above-described process, the total power amount (power consumption amount) consumed by the computer 10 in the predetermined time period, and the power-saving effect value reduced by the component set in the power-saving state in the computer 10, are recorded in the database 310.

Figure 8:
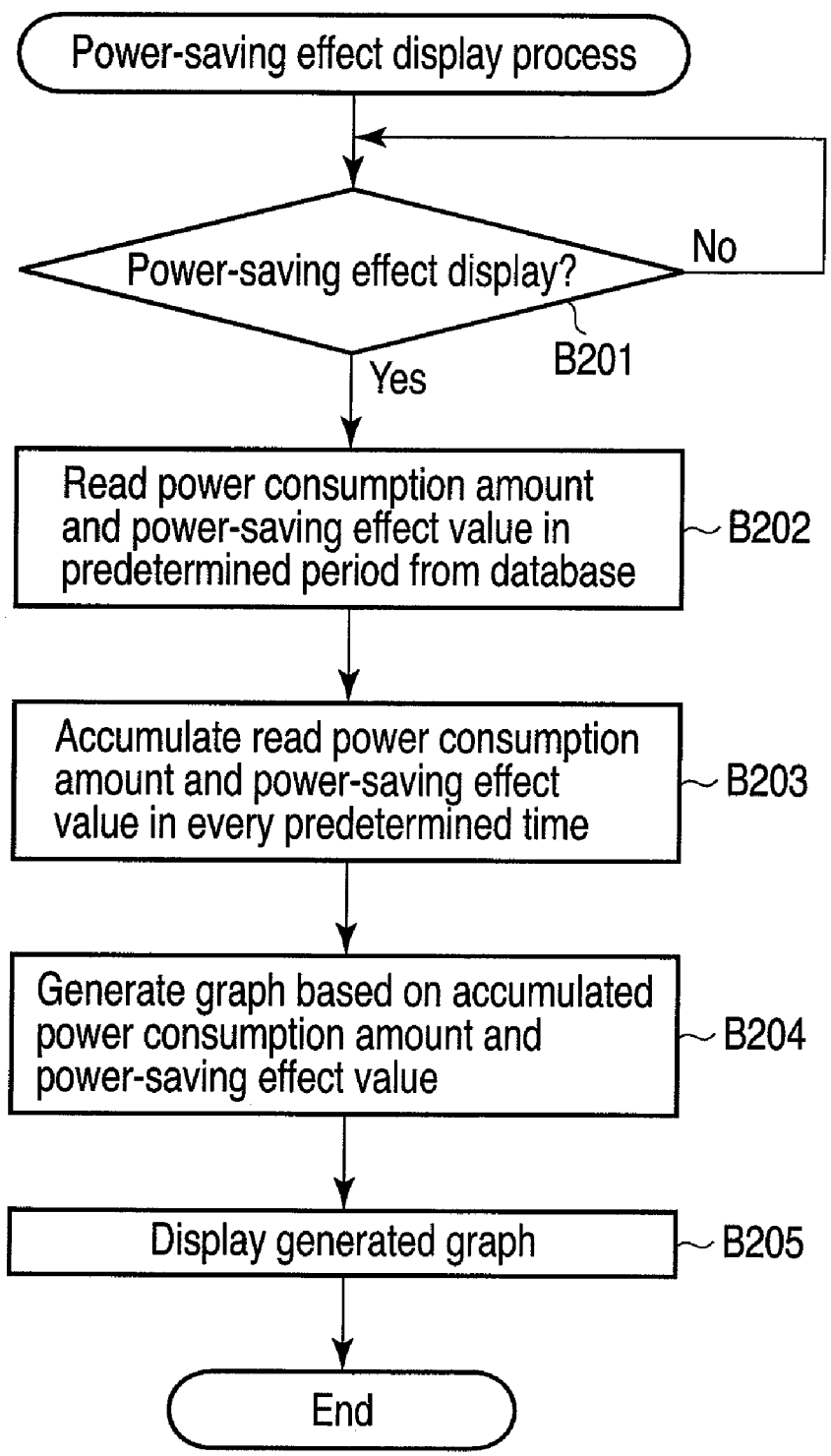
FIG. 8 is an exemplary flowchart showing an example of the procedure of a power-saving effect display process executed by the information processing apparatus of the embodiment.

FIG. 8 is the flowchart showing an example of the procedure of the power-saving effect display process executed by the computer 10.

To start with, the power-saving effect display application 202 determines whether a display request for displaying the power-saving effect has been input or not (block B201). The input of the display request for the power-saving effect is triggered, for example, by a user's request, or by the passage of a predetermined time period from the previous display.

If the display request for the power-saving effect has been input (YES in block B201), the power-saving effect display application 202 reads the data including the power consumption amount and power-saving effect value in a predetermined time period, from the log information 310A of the database 310 (block B202).

Subsequently, the power-saving effect display application 202 calculates the values respectively accumulated the read power consumption amounts and power-saving effect values in every predetermined time period (e.g. in every week or in every month) (block B203). The power-saving effect display application 202 generates the histogram, as shown in FIG. 6, indicating the date and period in the horizontal axis, and indicating the cumulative total values of the power consumption amount and power-saving effect value in the vertical axis (block B204).

The power-saving effect display application 202 presents the histogram to the user by displaying the generated histogram on the LCD 17, etc. (block B205).

By the above process, the display screen displays the power consumption amount of the computer 10 in every predetermined time period and the power amount (power-saving effect value) reduced by the power-saving setting in every predetermined time period. Thereby, the user can visually recognize the power amount reduced by the power-saving setting, and can understand the effect of the power-saving function. In addition, since the user can easily confirm the effect of the power-saving function, the use of the computer 10 in the power-saving setting can be promoted.

If values (recommendable value) with a high power-saving effect are not set for the power-saving parameters, or power-saving parameters with a low power-saving effect is set in order to give priority to a higher performance of the computer 10, the power-saving effect display application 202 may also display a power-saving effect value which is determined on the assumption that the computer 10 is used with the power-saving parameters setting with a high power-saving effect. In other words, the power-saving effect display application 202 may display a power-saving effect value, which could be obtained if the power-saving parameters setting with a high power-saving effect were selected, in comparison with the actual power consumption amount of the computer 10. The power-saving effect value on this assumption may be displayed, for example, in a different color, as distinguished from the power-saving effect value based on the actually reduced power amount as shown in FIG. 6. In this manner, by indicating the power-saving effect value which could be obtained if the power-saving parameter setting with a high power-saving effect were selected, the effectiveness of the power-saving setting can be appealed to the user and the power-saving setting can be promoted.

As regards personal computers, even if the computers are of the same model, the components in the computers 10 may differ due to customization by users or due to differences in lots. The power-saving effect display application program 202 calculates, with respect to each computer 10 that is used, the power-saving effect value by measuring the power-saving amount of each component in the computer 10. In other words, the power-saving effect display application program 202 calculates the power-saving effect value which is adaptive to the system configuration of each computer 10. Therefore, the power-saving effect value with higher precision can be calculated than in the case of using a power-saving amount measured in advance at the time of shipment of the computer 10.

As regards the power-saving amount of each component in the computer 10, even the power-saving amount of the same component may possibly vary due to, e.g. the usage pattern of the computer 10. As has been described above, the power-saving effect display module 202 measures the power-saving amount of each component, for example, in response to the boot of the computer 10, to the execution of the power-saving effect display application 202, or to the setting/change of the power-saving parameter. It is thus possible that the power-saving amount of the same component is measured twice or more. If the power-saving amount of the same component is measured twice or more, the power-saving effect display application 202 uses an average value, which is calculated by averaging the plural measured power-saving amounts, as the power-saving amount of the component. Thereby, the precision of the power-saving effect value calculated by using the power-saving amount can be enhanced.

Moreover, if the user selects the default power-saving setting (economy setting) which is recommendable in the computer 10, the power-saving effect display application 202 causes the components in the computer 10 to operate in the power-saving state in accordance with the default power-saving setting. The power-saving effect display application 202 can present to the user the power-saving effect by the default power-saving setting. In short, it is possible to present to the user the power-saving effect based on the power-saving setting provided by the system, in addition to the power-saving effect based on the power-saving parameter set by the user.

In the present embodiment, the power-saving amount corresponding to each component in the computer 10 is measured by the power-saving amount measuring module 303. Alternatively, the power-saving amount corresponding to each component may be stored in advance, for example, in a table, etc. In this case, the power-saving amount measuring module 303 executes, where necessary, a process of reading the power-saving amount corresponding to each component from the table.

As has been described above, according to the present embodiment, the power-saving effect corresponding to the power-saving setting of each individual component can be displayed. The computer 10 measures the power-saving amount of each component set in the power-saving state, in accordance with the power-saving parameter corresponding to each component in the computer 10. The computer 10 calculates the power-saving effect value based on the measured power-saving amount of each component and the operating time of the computer 10. The computer 10 displays on the screen the graph showing the values which are calculated by accumulating the actual power consumption of the computer 10 and the calculated power-saving effect value in every predetermined time period. Thereby, the user can understand the power-saving effect reflecting the power-saving setting of each component. In addition, the computer 10 can prompt the user to set the power-saving parameter with a high power-saving effect.

The power-saving setting of the present embodiment is applicable not only to the power-saving parameters exemplified in the description of the embodiment, but also to any component which varies the power consumption of the computer 10. Accordingly, the computer 10 can calculate the power-saving effect value on a component-by-component basis, with respect to any component which varies the power consumption of the computer 10.

All the procedures of the power-saving effect recording process and the power-saving effect display process according to the present embodiment may be executed by software. Thus, the same advantageous effects as with the present embodiment can easily be obtained simply by installing a program, which executes the power-saving effect recording process and the power-saving effect display process, into an ordinary computer through a computer-readable storage medium.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising a power-saving function, comprising:

a power-saving amount measuring module configured to measure a power-saving amount per unit time of each of predetermined components in the information processing apparatus;

a power-saving controller configured to set each of the predetermined components in either a normal operation state or a power-saving state, based on power-saving parameters corresponding to the predetermined components and being set by a user;

a power consumption measuring module configured to measure a total power amount consumed by the information processing apparatus in a predetermined time period;

a power-saving effect calculator configured to calculate a first power-saving effect value indicative of a power amount reduced in the predetermined time period due to the power-saving parameters, based on the power-saving parameters, the power-saving amount per unit time of each of the predetermined components, and an operating time of the information processing apparatus in the predetermined time period;

a power-saving effect estimation module configured to estimate a second power-saving effect value indicative of a power amount reduced in the predetermined time period while the power-saving parameters are set to recommendable values with high power-saving effects, based on the power-saving amount per unit time of each of the predetermined components, and the operating time of the information processing apparatus in the predetermined time period; and a log display module configured to display the total power amount, the first power-saving effect value and the second power-saving effect value.

2. The information processing apparatus of claim 1, wherein the power-saving amount measuring module is configured to select a component from the predetermined components, to measure a first power consumption of the information processing apparatus when the selected component is in the normal operation state, to measure a second power consumption of the information processing apparatus when the selected component is in the power-saving state, and to calculate a difference between the first power consumption and the second power consumption as a power-saving amount per unit time of the selected component.

3. The information processing apparatus of claim 1, wherein the power-saving effect calculator is configured to calculate the first power-saving effect value based on the power-saving parameters, power-saving amount per unit time of each of the predetermined components, and the operating time of the information processing apparatus in the predetermined time period, the power-saving amount being indicated by a plurality of pieces of power-saving information stored in a storage device, and the plurality of pieces of power-saving information corresponding to the predetermined components, and the power-saving effect estimation module is configured to estimate the second power-saving effect value based on the power-saving amount per unit time of each of the predetermined components indicated by the plurality of pieces of power-saving information, and the operating time of the information processing apparatus in the predetermined time period.

4. The information processing apparatus of claim 1, wherein the power consumption measuring module is configured to measure the total power amount by measuring a current value and a voltage value used by the information processing apparatus, calculating power consumption by using the current value and the voltage value, and accumulating the calculated power consumption in the predetermined time period.

5. The information processing apparatus of claim 1, further comprising a log storing module configured to store information indicative of the total power amount, the first power-saving effect value and the second power-saving effect value as log information in a storage device, wherein the log display module is configured to display cumulative total values periodically calculated by accumulating the total power amount, the first power-saving effect value and the second power-saving effect value respectively, based on the log information.

6. The information processing apparatus of claim 2, wherein the power-saving effect calculator is configured to select components in the power-saving state from the predetermined components, based on the power-saving parameters, and to calculate the first power-saving effect value based on the power-saving amount corresponding to the selected component and the operating time of the information processing apparatus.

7. The information processing apparatus of claim 2, wherein the power-saving parameters comprise a first parameter which designates an operation level with different power consumption of a component of the predetermined components, and the power-saving amount measuring module is configured to measure a first power consumption of the information processing apparatus comprising the component in the normal operation state, to measure a second power consumption of the information processing apparatus comprising the component in the power-saving state designated by the first parameter, and to calculate a difference between the first power consumption and the second power consumption as a power-saving amount of the component.

8. The information processing apparatus of claim 2, wherein the power-saving amount measuring module is configured to calculate the power-saving amount per unit time of each of the predetermined components if the information processing apparatus is booted, or if the power-saving parameters are changed.

9. The information processing apparatus of claim 5, wherein the log display module is configured to display the total power amount, the first power-saving effect value and the second power-saving effect value accumulated on a daily basis, on a weekly basis, on a monthly basis, or on a yearly basis, in graph form.

10. The information processing apparatus of claim 5, wherein the log display module is configured to extract information indicative of the total power amounts, the first power-saving effect values and the second power-saving effect values in a first time period from the log information, to calculate a total power amount in every second time period that is shorter than the first time period, a first power-saving effect value in the every second time period, and a second power-saving effect value in the every second time period, the total power amount in the every second time period, the first power-saving effect value in the every second time period and the second power-saving effect value in the every second time period being calculated by accumulating the extracted total power amount, the extracted first power-saving effect value and the extracted second power-saving effect value respectively in the every second time period, and to display the calculated total power amount in the every second time period, the calculated first power-saving effect in the every second time period and the calculated second power-saving effect value in the every second time period.

11. A power-saving effect display method of displaying an effect of a power-saving function of an information processing apparatus, the method comprising:

measuring a power-saving amount per unit time of each of predetermined components in the information processing apparatus;

setting each of the predetermined components in either a normal operation state or a power-saving state, based on power-saving parameters corresponding to the predetermined components and being set by a user;

measuring a total power amount consumed by the information processing apparatus in a predetermined time period;

calculating a first power-saving effect value indicative of a power amount reduced in the predetermined time period due to the power-saving parameters, based on the power-saving parameters, the power-saving amount per unit time of each of the predetermined components, and an operating time of the information processing apparatus in the predetermined time period;

estimating a second power-saving effect value indicative of a power amount reduced in the predetermined time period while the power-saving parameters are set to recommendable values with high power-saving effects, based on the power-saving amount per unit time of each of the predetermined components, and the operating time of the information processing apparatus in the predetermined time period; and displaying the total power amount, the first power-saving effect value and the second power-saving effect value.

12. A computer readable storage medium having a computer program stored thereon that when executed by a computer, causes the computer to:

measure a power-saving amount per unit time of each of predetermined components in the information processing apparatus;

set each of the predetermined components in either a normal operation state or a power-saving state, based on power-saving parameters corresponding to the predetermined components and being set by a user;

measure a total power amount consumed by the information processing apparatus in a predetermined time period;

calculate a first power-saving effect value indicative of a power amount reduced in the predetermined time period due to the power-saving parameters, based on the power-saving parameters, the power-saving amount per unit time of each of the predetermined components, and an operating time of the information processing apparatus in the predetermined time period;

estimate a second power-saving effect value indicative of a power amount reduced in the predetermined time period while the power-saving parameters are set to recommendable values with high power-saving effects, based on the power-saving amount per unit time of each of the predetermined components, and the operating time of the information processing apparatus in the predetermined time period; and display the total power amount, the first power-saving effect value and the second power-saving effect value.

* * * * *